(12) United States Patent
Shiraki (10) Patent No.: US 11,875,075 B2
(45) Date of Patent: Jan. 16, 2024

(54) IMAGE FORMING APPARATUS, METHOD, AND PROGRAM

(71) Applicant: Konica Minolta, Inc., Tokyo (JP)

(72) Inventor: Yoko Shiraki, Ebina (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 18/178,152

(22) Filed: Mar. 3, 2023

(65) Prior Publication Data

US 2023/0205470 A1  Jun. 29, 2023

Related U.S. Application Data (63) Continuation of application No. 17/823,556, filed on Aug. 31, 2022, now Pat. No. 11,599,317, which is a continuation-in-part of application No. 17/355,936, filed on Jun. 23, 2021, now Pat. No. 11,461,600.

(30) Foreign Application Priority Data

Jun. 24, 2020 (JP) ................................. 2020-109180

(51) Int. Cl.
*G06F 3/12* (2006.01)

(52) U.S. Cl.
CPC .......... *G06F 3/1256* (2013.01); *G06F 3/1208* (2013.01); *G06F 3/1219* (2013.01)

(58) Field of Classification Search
CPC ..... G06F 3/1256; G06F 3/1208; G06F 3/1219
See application file for complete search history.

(56) References Cited

U.S. PATENT DOCUMENTS

| | | | | |
|---|---|---|---|---|
| 2007/0229875 A1* | 10/2007 | Suzuki | ................. | G06K 15/005 |
| | | | | 358/1.14 |
| 2013/0293923 A1* | 11/2013 | Fisher | ................... | G06F 3/1285 |
| | | | | 358/1.15 |
| 2013/0301083 A1 | 11/2013 | Kaneda | | |
| 2016/0231964 A1* | 8/2016 | Oki | ........................ | H04N 1/047 |
| 2017/0270658 A1 | 9/2017 | Kaneko | | |
| 2019/0114759 A1 | 4/2019 | Azumai | | |
| 2021/0142459 A1* | 5/2021 | Ito | ........................... | G06T 7/001 |

FOREIGN PATENT DOCUMENTS

| | | |
|---|---|---|
| JP | 2003-094737 A | 4/2003 |
| JP | 2016-146514 A | 8/2016 |
| JP | 2019-136938 A | 8/2019 |

OTHER PUBLICATIONS

Japan Patent Application No. 2020-109180; Notice of Reasons for Refusal; dated Nov. 7, 2023; 6 pages.

* cited by examiner

*Primary Examiner* — Moustapha Diaby
(74) *Attorney, Agent, or Firm* — BakerHostetler (57) ABSTRACT

An image forming apparatus enables utilizing an output of proof printing as an output of final printing, wherein the image forming apparatus includes an image former forming an image on a sheet, an image reader reading an image formed on the sheet, and a controller, wherein the controller acquires a determination result of whether or not a sheet, on which an image read by the image reader is formed before the final printing by the image former in order to create a reference image to be used for inspecting an output matter of a printing job, can be used for an output matter of the final printing and controls the number of sheets or copies on which the images are to be formed using the image former at the final printing.

19 Claims, 8 Drawing Sheets

| | 1st Page | 2nd Page | 3rd Page | 4th Page | 5th Page |
|---|---|---|---|---|---|
| 1st Copy | 1 | 2 (Left-Top Spiled) | 3 (Left-Bottom Spiled) | 4 | 5 (Left-Top Spiled) |
| 2nd Copy | 1 | 2 (Right-Bottom Spiled) | 3 | 4 | 5 (Right-Bottom Spiled) |
| 3rd Copy | 1 | 2 | 3 | 4 (Center Spiled) | 5 (Center Spiled) |
| 4th Copy | 1 | 2 | 3 | 4 | 5 |
| 5th Copy | 1 | 2 | 3 | 4 | 5 |
| ... | | | | | |

IMAGE FORMING APPARATUS, METHOD, AND PROGRAM

CROSS REFERENCE TO RELATED APPLICATIONS

This application is a continuation application of U.S. application Ser. No. 17/823,556 filed Aug. 31, 2022, which is a continuation of U.S. application Ser. No. 17/355,936, filed Jun. 23, 2021, and claims priority of Japanese patent application No. 2020-109180 filed on Jun. 24, 2020, the contents of which applications are incorporated by reference herein in their entireties.

BACKGROUND

Technical Field

The present invention relates to an image forming apparatus, an image forming method and an image forming program.

Description of the Related Art

An image forming apparatus such as an MFP (Multi-Functional Peripheral) may create stain from toner or the like, streaks, spot-shaped image-noises called fireflies, and the like on an image formed on a sheet. Therefore, an automatic image inspection device is provided in the image forming apparatus to inspect the image formed on the sheet. This automatic image inspection device is a device that compares an image (reference image) obtained by scanning during proof printing (trial printing) before final printing with an image (inspection image) obtained by scanning during the final printing and extracts a difference between the reference image and the inspection image to judge quality of the inspection image. In addition, interlocking the automatic image inspection device and the sorting device allows excluding an output matter (spoiled paper) from which the difference is extracted to obtain an output matter of only non-defective matters.

Regarding such an image inspection, for example, Patent Literature: Japanese unexamined patent application No. 2016-146514 discloses an image forming apparatus including: an image former forming an image on a paper; an image reader reading a paper surface on which the image is formed by the image former to create a scan image; an image checker comparing the scanned image created by the image reader to a correct image (reference image) to detect an abnormality in the scanned image; and a history generation unit generating a history image by generating detection information indicating detections of respective abnormalities and embedding the created detection information of the respective abnormalities in the scan image when at least one abnormality is detected by the image checker.

For the above-mentioned reference image, for example, an image obtained by scanning during the proof printing before the final printing is visually confirmed and set by a user. There is also a technique of using an RIP (rasterized) image of the print source data as a reference image, but an image printed by an electrophotographic image forming apparatus tends to be slightly larger in a sub-scanning direction. Therefore, it is preferable to use an image obtained by scanning an output printed by the image forming apparatus as a reference image instead of an RIP image from the print source data. Further, conventionally, the output for the proof printing used for generating the reference image has been discarded without being used as the output of the formal printing.

SUMMARY

Technical Problem

It is not economical to discard the output (printed matter) of the proof print when the reference image is created as in the conventional case. In particular, when the number of pages of the print source data is large (in a case of material having the large number of pages), it is wasteful of resources to discard sheets having no spoilage outputted at the time of the proof printing without utilizing. Further, if the proof printings are carried out for a plurality of times (if the proof printing of large number of copies are carried out) until obtaining the satisfactory reference image, it is more wasteful of resources to discard sheets having no spoilage outputted at the time of the proof printing without utilizing.

The present invention has been made in view of the above-mentioned problems, and it is at least one of objects of the present invention to provide an image forming apparatus, an image forming method, and an image forming program capable of utilizing an output of the proof printing as an output of the final printing.

Solution to Problem

To achieve the at least one of the abovementioned objects, the following solutions are provided according to several aspects of the present invention.

(1) an image forming apparatus including: an image former forming an image on a sheet, an image reader reading the image formed on the sheet, and a controller, wherein the controller acquires a determination result of whether or not a sheet, on which an image read by the image reader is formed before the final printing by the image former in order to create a reference image to be used for inspecting an output matter of a printing job, can be used for an output matter of final printing and controls on a basis of the determination result the number of sheets or copies on which the images are to be formed using the image former at the final printing.

(2) the image forming apparatus according to above (1), wherein the controller determines whether or not the sheet on which the image is formed before the final printing by the image former is available for an output matter of the final printing on a basis of scanned data read by the image reader.

(3) the image forming apparatus according to (1), wherein the controller acquires information on the sheet determined to be available for the output matter of the final printing through a user's input operation.

(4) the image forming apparatus according to any one of above (1) to (3), wherein the controller makes the image former form images at the final printing by the number of sheets obtained by subtracting the number of the sheets determined to be available for the output matter at the final printing from the number of sheets directed to the printing job.

(5) the image forming apparatus according to any one of the above (1) to (3), wherein the determination result is obtained per copy on whether or not the sheets are available for the output of the final printing, wherein the controller makes the image former form images at the final printing by the number of sheets obtained by subtracting the number of the sheets determined to be available for the output matter at the final printing from the number of sheets directed to the printing job.

(6) the image forming apparatus according to any one of the above (1) to (5), wherein the image data processed by the printing job includes a single page or multiple pages.

(7) the image forming apparatus according to any one of above (1) to (6), wherein the controller takes in the sheets that are determined to be available for an output of the final printing from a second paper feed that is different from a first paper feed for feeding a sheet to be used at the final printing.

(8) the image forming apparatus according to the above (7), wherein the controller also takes in a sheet that is unavailable for the output of the final printing from the second paper feed and discharges the sheet unavailable for the output of the final printing to a second paper discharging means different from a first paper discharging means to which a paper for the final printing is discharged.

(9) the image forming apparatus according to any one of above (1) to (8), wherein the controller notifies the user on information on the sheets available for the output of the final printing or information on the number of the papers or the number of the copies whose images are formed by the image former at the final printing.

(10) the image forming apparatus according to above (9), wherein the controller receives a user's selection of whether or not to use the sheet determined to be available for the output of the final printing as the output matter at the final printing actually.

(11) an image forming method, implemented by an image forming apparatus, the image forming apparatus including: an image former forming an image on a sheet, an image reader reading the image formed on the sheet, and a controller, wherein the method causes the controller to execute: acquiring a determination result of whether or not a sheet, on which an image read by the image reader is formed before final printing by the image former in order to create a reference image to be used for inspecting an output matter of a printing job, can be used for an output matter of the final printing; and controlling on a basis of the determination result the number of sheets or copies on which the images are to be formed using the image former at the final printing.

(12) a computer-readable non-volatile storage including an image forming program implemented in an image forming apparatus, the image forming apparatus including: an image former forming an image on a sheet, an image reader reading the image formed on the sheet, and a controller, wherein the program, when executed by the controller, causes the controller to perform: acquiring a determination result on whether or not a sheet, on which an image read by the image reader is formed before final printing by the image former in order to create a reference image to be used for inspecting an output matter of a printing job can be used for an output matter of the final printing; and controlling on a basis of the determination result the number of sheets or copies on which the images are to be formed using the image former at the final printing.

BRIEF DESCRIPTION OF DRAWINGS

The advantages and features provided by one or more embodiments of the invention may be more clearly understood from detailed description given hereinbelow and the appended drawings, which are given by way of illustration only and thus are not to be understood as a definition of the limits of the present invention. The drawings are as follows.

DETAILED DESCRIPTION OF EMBODIMENTS

Hereinafter, embodiments of the present invention are described in detail with reference to the drawings. Each figure is only schematically shown to the extent that the present invention is able to be fully understood. Therefore, the scope of the invention is not limited to the illustrated examples. Further, in each figure, common components or similar components are designated by the same reference signs, and duplicate description thereof is omitted. In addition, detailed description of known features not directly related to the present invention may be omitted.

<Overview of Embodiment>

As shown in the "background", the image forming apparatus may create the stain from the toner or the like, streaks, spot-shaped image-noises called fireflies, and the like on the image formed on the sheet. Therefore, the automatic image inspection device is provided in the image forming apparatus to compares the reference image (also called "correct image") to the inspection image obtained by scanning during the final printing and extracts a difference between the reference image and the inspection image to judge quality of the inspection image or to exclude the output matter (spoiled paper) from which any difference is extracted.

In the present embodiment, in a case in which the reference image to be used in the inspection of the final printing is created from the scanned image of the output matter (printed matter) at the time of the proof printing (trial printing), the output matter of the proof printing is taken in at an appropriate timing of the final printing at which the corresponding page of the corresponding copy of the output matter of the proof printing should be taken in, and the output matter of the proof printing taken in is outputted as the final printing output. At this time, the image forming apparatus executes the image forming by the page number obtained by subtracting the number of the proof printing output matters taken in at the final printing.

<Configuration of Image Forming Apparatus of Embodiment>

Figure 1:
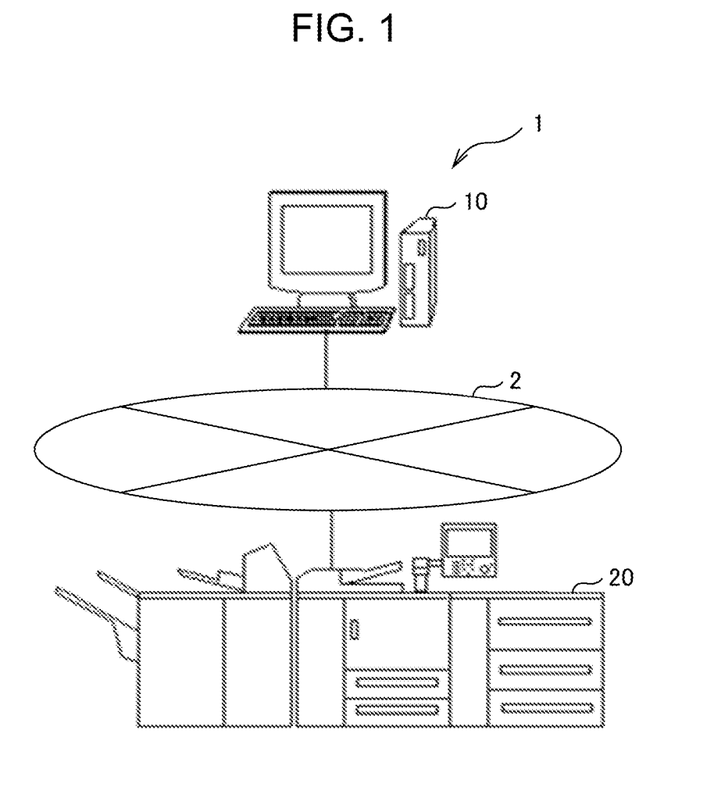
FIG. 1: a general configuration diagram of a printing system including an image forming apparatus according to an embodiment of the present invention.

FIG. 1 is a general configuration diagram of a printing system 1 including an image forming apparatus 20 according to an embodiment of the present invention.

The printing system 1 shown in FIG. 1 is a system that creates a printed matter from an RIP (rasterized) image of print source data. The printing system 1 creates a reference image from a scanned image of the printed matter outputted at the time of the proof printing (trial printing) and compares a scanned image of the printed matter outputted at the time of the final printing to the reference image created to inspect quality of the printed matter of the final printing (for example, whether or not spoilage is included).

As shown in FIG. 1, the printing system 1 includes a client terminal 10, an image forming apparatus 20, and the like. These apparatuses are connected to each other via a communication network 2 such as a LAN (Local Area Network) or a WAN (Wide Area Network) defined by standards such as Ethernet™, Token Ring, and FDDI (Fiber-Distributed Data Interface). Hereinafter, each apparatus is described.

<Client Terminal>

Figure 2:
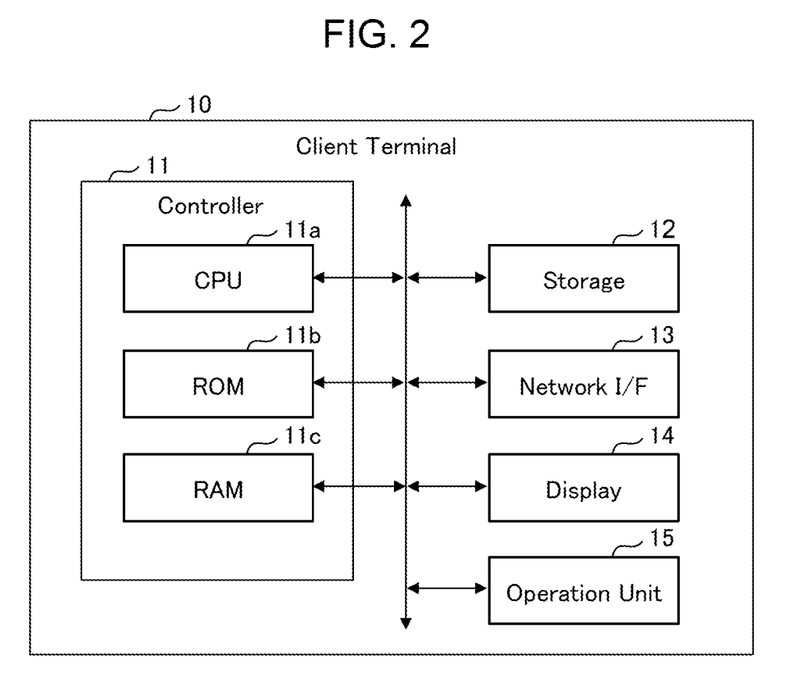
FIG. 2: a hardware configuration diagram of a client terminal according to the embodiment of the present invention.
Figure 3:
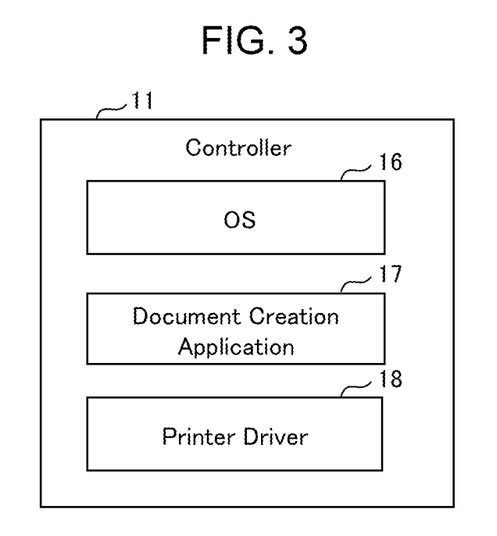
FIG. 3: a functional configuration diagram of the client terminal according to the embodiment of the present invention.

The configuration of the client terminal 10 is described with reference to FIGS. 2 and 3. FIG. 2 is a hardware configuration diagram of the client terminal 10 according to the embodiment of the present invention. FIG. 3 is a functional configuration diagram of the client terminal 10 according to the embodiment of the present invention.

As shown in FIG. 2, the client terminal 10 includes a controller 11, a storage 12, a network OF (interface) unit 13, a display unit 14, an operation unit 15, and the like. The client terminal 10 is a device such as a personal computer. The client terminal 10 creates and transmits a print job to the image forming apparatus 20.

The controller 11 includes, for example, a CPU (Central Processing Unit) 11a memory such as a ROM (Read Only Memory) 11b or a RAM (Random Access Memory) 11c. The CPU 11a expands a control program stored in the ROM 11b or the storage 12 into the RAM 11c and executes it to control an operation of the entire client terminal 10.

As shown in FIG. 3, the controller 11 (particularly the CPU 11a) executes an OS (Operating System) 16, a document creation application 17, a printer driver 18, and the like.

The OS 16 is, "Windows™", "Mac OS™", "Android™", and the like, and enables the document creation application 17 and the printer driver 18 to operate in the client terminal 10.

The document creation application 17 is software that performs sentence creation, spreadsheets, image processing, and the like, and enables creation of a document composed of a single page or a plurality of pages. The controller 11 retrieves the printer driver 18 at a time of issuing a print instruction, and transfers data created by the document creation application 17 to the printer driver 18.

The printer driver 18 displays a print condition setting screen (print setting screen) on the display unit 14 and receives a print condition set by the user. The printer driver 18, when the setting of the print condition is completed, converts application format data created by the document creation application 17 into PDL (Page description Language) data such as PJL (Printer Job Language), PS (PostScript), or PCL (Printer Control Language). Then, the printer driver 18 transmits the PDL data converted to the image forming apparatus 20 as a print job together with the print condition setting data (print setting data). Note that it is assumed that the printer driver 18 has two modes, print and save. In the print mode, the image forming apparatus 20 prints by the print job transmitted from the client terminal 10. In the save mode, printing is not immediately performed for the print job transmitted from the client terminal 10, and the print job is saved in the storage 22 or the like of the image forming apparatus 20.

The storage 12 includes an HDD (Hard Disk Drive), an SSD (Solid State Drive), and the like, and stores a program that the CPU 11a runs to control each unit, information on a processing function of an own apparatus, and data created by the document creation application 17, a print job created by the printer driver 18, and the like.

The network I/F unit 13 includes an NIC (Network Interface Card), a modem, or the like, connects the client terminal 10 to the communication network 2, and transmits a print job to the image forming apparatus 20.

The display unit 14 includes a liquid crystal display device (LCD: Liquid Crystal Display), an organic EL (Electroluminescence) display device, and the like, and displays a document creation screen from the document creation application 17, a print setting screen from the printer driver 18 according to a display control signal inputted from the controller 11.

The operation unit 15 includes a mouse, a keyboard, and the like, receives operations such as creating a document on the document creation screen and a setting on a print condition on the print setting screen, and outputs an operation signal to the controller 11.

<Image Forming Apparatus>

Figure 4:
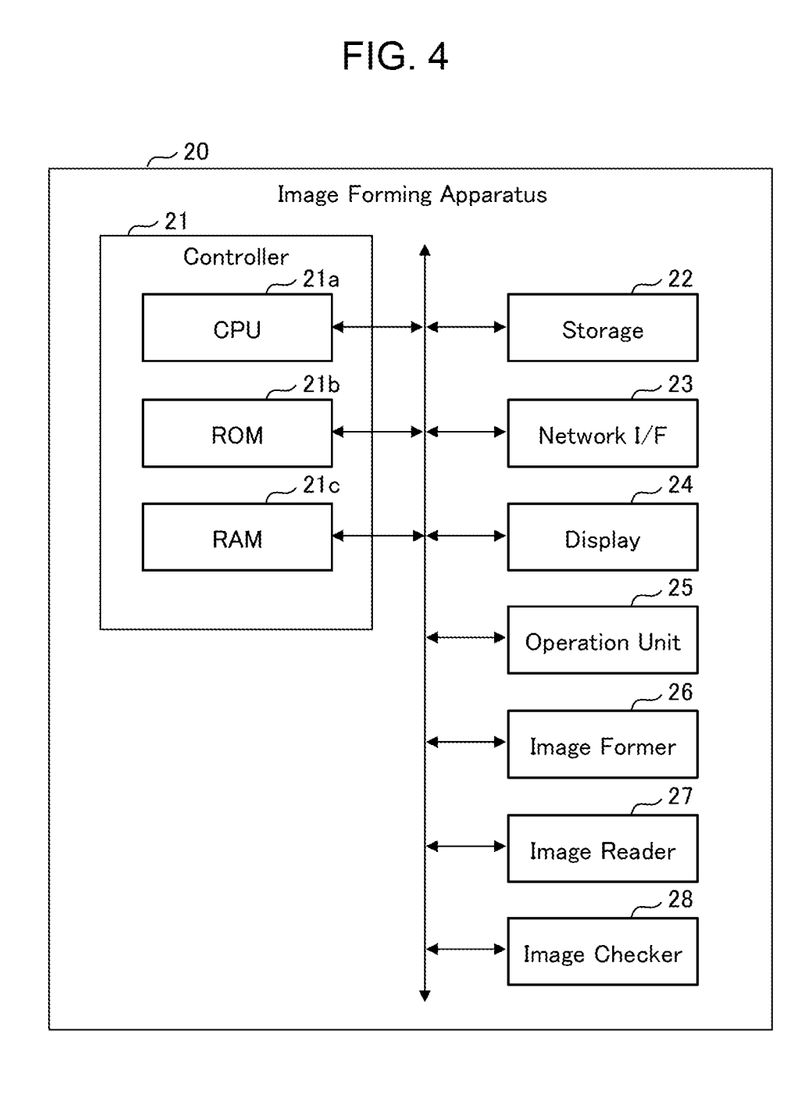
FIG. 4: a hardware configuration diagram of the image forming apparatus according to the embodiment of the present invention.
Figure 5:
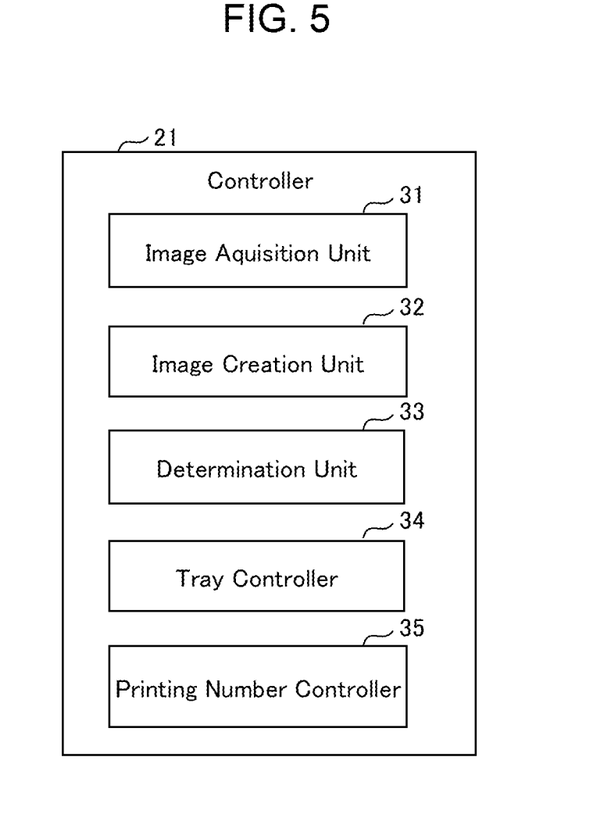
FIG. 5: a functional configuration diagram of the image forming apparatus according to the embodiment of the present invention.

Referring to FIGS. 4 and 5, a configuration of the image forming apparatus 20 is described. FIG. 4 is a hardware configuration diagram of the image forming apparatus 20 according to the embodiment of the present invention. FIG. 5 is a functional configuration diagram of the image forming apparatus 20 according to the embodiment of the present invention.

As shown in FIG. 4, the image forming apparatus 20 includes a controller 21, a storage 22, a network I/F unit 23, a display operation unit 24, an image processing unit 25, an image former 26, and an image reader 27, an image checker 28, and the like. The image forming apparatus 20 is an apparatus, such as an MFP (Multi-Functional Peripherals), forming an image on a medium, which is assumed as a sheet in this embodiment. The MFP has functions such as a copier, a printer, and a facsimile machine. The image forming apparatus 20 receives a print job from the client terminal 10 and executes the print job received.

The controller 21 includes a CPU 21a, and a memory such as a ROM 21b and a RAM 21c. The CPU 21a performs a central control of an operation of the image forming apparatus 20 by reading a program (including an image forming program described below) corresponding to a processing function from the ROM 21b or the storage 22 and developing and executing the program on the RAM 21c.

The storage 22 includes an HDD, SSD, or the like, and stores a program (including an image forming program) for the CPU 21a to control each unit, information on the processing function of the own apparatus, rasterized image data of a printing job created by the image processing unit 25, scanned image data read by the image reader 27, a reference image created by the image creation unit 32 (see FIG. 5), information on an output matter of the proof printing that can be used as an output of the final printing, an inspection result from the inspection unit 28, and the like.

The network I/F unit 23 includes an NIC, a modem, and the like, connects the image forming apparatus 20 to the communication network 2, receives a print job from the client terminal 10, or sends and receives various data with another image forming apparatus 20.

The display operation unit 24 includes a touch panel and the like, wherein the touch panel is provided on a display unit such as an LCD or an organic EL display with an operation component (touch sensor) of one of types such as a pressure-sensitive type or a capacitance type in which transparent electrodes are arranged in a grid pattern, and serves as a display unit and an operation unit. The display unit 24 displays various operation screens, including a sheet usage setting screen 50 described below (see FIG. 7), an image forming status, an operation status of each function, and the like according to the display control signal inputted from the controller 21. The operation unit receives various input operations inputted by a user, including a sheet selection operation using the sheet-usage setting screen 50 (see FIG. 7), and outputs an operation signal to the controller 21. Note that the display unit and the operation unit may be separately provided, although the touch panel in which the display unit and the operation unit are integrated is illustrated here.

The image processing unit 25 functions as an RIP (Raster Image Processor), and creates intermediate data (display list (DL), which is an intermediate language) from a print job, and rasterizes each page of a document to create bitmap format image data. Further, the image processing unit 25 performs screen processing, gradation adjustment, density balance adjustment, thinning, halftone dot processing, and the like on the image data, as necessary. Then, the image processing unit 25 outputs the created image data to the image former 26.

The image former 26 includes components such as a charging device, a photoconductor drum, an exposure device, a transfer roller, a transfer belt, and a fixing device that are necessary for image forming using an image forming process of one of methods of an electrophotographic method, an electrostatic recording method, and the like, and forms an image of each page of a document on a sheet. Specifically, the image former 26 irradiates light corresponding to the image data with the exposure device to the photoconductor drum charged by the charging device to form an electrostatic latent image; adheres toner charged by a developing device on the electrostatic latent image to develop it; and transfers the toner image to a sheet via a primary transfer roller and a secondary transfer belt and fixes the image transferred with the fixing device.

The image reader 27 scans the image formed on the sheet to acquire a scanned image (scanned image). The image reader 27 includes, for example, three types of sensors, R (Red), G (Green), and B (Blue), and detects RGB values according to the amount of light reflected by the sheet to obtain an image to output the values as data. Further, if necessary, a background color switching unit for holding a plurality of colors of background plates in a switchable manner is provided. The background color switching unit may switch a background color according to colors of a sheet and an image formed on the sheet when the image reader 27 scans the sheet.

The image checker 28 compares a read image (inspection image) obtained by reading a sheet on which an image is formed according to a print job to an image to be an inspection criteria (reference image) created by the image creation unit 32 described below at a time of the final printing of a document, and thereby determines quality of the inspection image (presence or absence of difference). Further, the image checker 28 separates a non-defective matter having no difference from a defective matter having a difference if necessary, based on the inspection result of the image checker 28, and discharges both matters into a different paper discharge tray. The image reader 27 (or the image reader 27 and a background color switching unit) and the image checker 28 mainly constitute an automatic image inspection device.

Next, description is given of a function implemented by the controller 21 of the image forming apparatus 20 with reference to FIG. 5. As shown in FIG. 5, the controller 21 (particularly the CPU 21*a*) serves as an image acquisition unit 31, an image creation unit 32, a determination unit 33, a tray controller 34, a print number controller 35, and the like.

At the time of the proof printing (trial printing) of a document, the image acquisition unit 31 causes the image former 26 to form an image of the same page on a plurality of sheets, causes the image reader 27 to read the images of the same page formed on the plurality of sheets and to acquire the plurality of read images corresponding to the plurality of sheets, and outputs the plurality of read images to the storage 22 and the image creation unit 32. Further, at the time of the final printing of the document, the image acquisition unit 31 causes the image former 26 to form an image of each page of the document on a sheet, causes the image reader 27 to read the image of each page formed on the sheet and to acquire the read image of each page, and outputs the read images to the storage 22 and the image checker 28.

The image creation unit 32 compares a plurality of scanned images of the same page, and creates a reference image (also called a "correct image") used for inspecting the printed image of the document according to the number of the scanned images in which difference (for example, difference of each pixel value) falls within a predetermined range among the plurality of the scanned images. The case in which difference falls within the predetermined range includes, for example, a case in which the number of pixels whose difference in its pixel value exceeds a predetermined threshold value is less than or equal to the predetermined number and a case in which a density of pixels whose difference in its pixel value exceeds the predetermined threshold is less than a predetermined density value.

Further, the image creation unit 32 can create the reference image on a basis of the scanned images whose difference is within the predetermined value (for example, using an average of pixel values of a plurality of scanned images) when the number of scanned images whose difference is within the predetermined value is equal to or more than the predetermined number. A, and one of the scanned images whose difference is within a predetermined value can be used as the reference image.

Further, the image creation unit 32, when there is a page in which the number of scanned images whose difference is within the predetermined value does not exceed the predetermined number even if the images are formed on a predetermined number of sheets, can perform a notification for prompting the user to confirm the images formed on the predetermined number of sheets or a plurality of scanned images corresponding to the predetermined number of sheets for the concerned page. At this time, the plurality of the scanned images may be displayed on the display operation unit 24, and a scanned image selected from the plurality of the scanned images may be used as the reference image for the page. Further, the image creation unit 32 can create a reference image group for a document by integrating the reference images of respective pages (connecting them across the copies) of the document including a plurality of pages.

Further, the controller 21 can continue a processing of the same page (image formation/image reading/acquisition of scanned image/comparison of scanned images) until the number of scanned images whose difference is within the predetermined value becomes the predetermined number or more; or a processing of only pages among multiple pages that make up a document where the number of scanned images whose difference is less than the predetermined value is less than the predetermined number.

The determination unit 33 acquires a determination result of determining an output matter that can be used as an output matter at the final printing among the output matter (here, a sheet is assumed) in which an image is formed by the proof printing. The determination unit 33 acquires the determination result by itself, for example, by determining that a sheet that is not spoiled at the proof printing can be used as an output matter of the final printing. More specifically, the determination unit 33 determines whether or not an image printed at the proof printing can be used as an output matter of the final printing based on the read data of the image printed at the proof printing.

Further, the determination unit 33 may acquire information (that is, determination result) of the output matter of the proof printing that can be used as the output matter of the final printing via an input operation of a user. In this case, the user, for example, visually confirms the output matter of the proof print and inputs whether it can be used as the output matter of the final printing. Further, the determination unit 33 may determine whether or not the output matter of the proof print can be used as the output matter for the final printing based on any other information inputted by the user.

Further, the determination unit 33 may determine that a sheet cannot be used as the output matter of the final printing when the user gives an instruction not to use the sheet as the output matter of the final printing even if the sheet is not spoiled. At that time, information for identifying a sheet without spoilage (that is, information on a sheet that can be used as the output of the final printing, for example, a page number or a copy number) can be displayed on the display operation unit 24, and the determination unit 33 determines that the sheet selected among the displayed sheets (or the sheet not selected) can be used as the output matter of the final printing.

The determination unit 33 outputs, for example, information on whether or not to use the output matter outputted at the proof printing as the output matter of the final printing to units such as the storage 22, the tray controller 34, and the print number controller 35. The information outputted by the determination unit 33 to the storage 22 or the like may be, for example, only information about the sheets to be used, only information about the sheets not to be used, or information about both of the sheets to be used and the sheets not to be used. In addition, the information outputted by the determination unit 33 to the storage 22 or the like is preferably associated with information that identifies a sheet on which an image is formed by the proof printing. A way of the association is not limited to a particular one, and for example, may be an association using information that combines a page number and a copy number, association using an order in which sheets are outputted, and the like.

The tray controller 34 controls paper feed and discharge during the proof printing and during the final printing. A control of a sheet performed by the tray controller 34 may be one corresponding to, for example, an operation way of the image forming apparatus 20.

The tray controller 34 discharges, for example, a sheet on which an image is formed by the proof printing (including both a sheet that can be used as an output of the final printing and a sheet that cannot be used as it) to a predetermined tray. The user takes out the sheet ejected by the proof printing and puts the sheet as it is taken out (the sheets whose order is not changed nor increased/decreased) in a predetermined tray (preferably a tray different from a tray in which the sheet is fed at the final printing, for example, an inserter tray). The tray controller 34 takes in a sheet from the inserter tray at a timing of an appropriate copy and page of the final printing, and discharges the taken-in sheet as the output matter of the final printing. The unusable sheet is discharged to a predetermined tray (preferably a tray different from the tray for discharge at the final printing, for example, a purge tray).

The print number controller 35 controls the number of sheets (or the number of copies) to be formed by the image former 26 at the time of the final printing based on the determination result from the determination unit 33. For example, suppose that 100 sheets of a single-page image data are printed, and 5 sheets that can be used as output matters for the final printing are outputted by the proof printing. In this case, the print number controller 35 causes the sheets to be outputted at the final printing by the number equal to the number of prints (here, 100 sheets) set in the print job minus the number of prints (here, 5 sheets) outputted by the proof printing (95 sheets in this case). It should be noted that it may be determined in a unit of copies whether or not the output matter of the proof printing can be used at the final printing, and the copies may be outputted at the final printing by the number of copies obtained by subtracting the number of copies outputted at the proof printing from the number of copies set in the print job.

Figure 6:
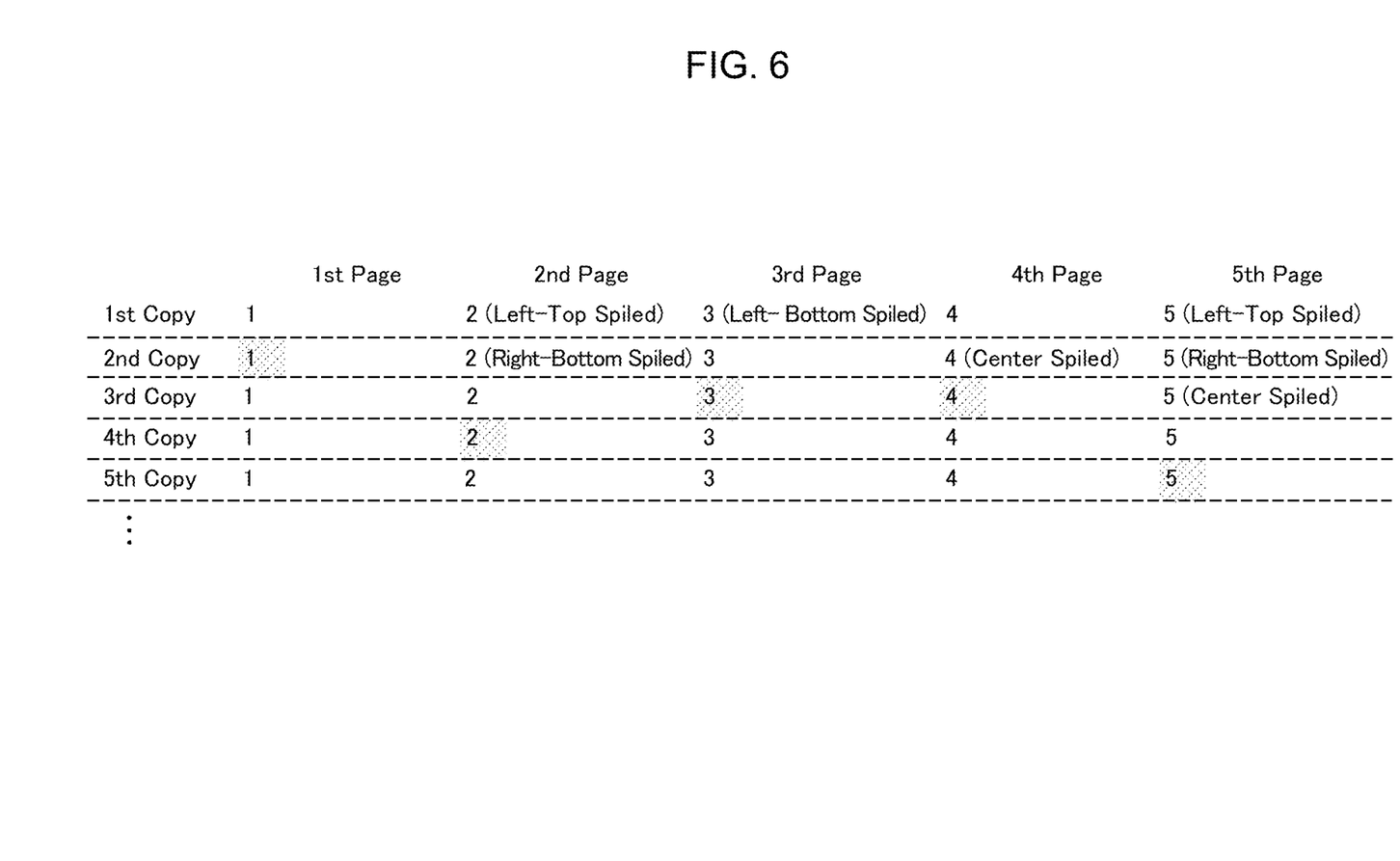
FIG. 6: a diagram for explaining a method of creating a reference image in the image forming apparatus according to the embodiment of the present invention.

Next, description is given of a method of creating a reference image using the image forming apparatus 20 configured as described above with reference to FIG. 6. FIG. 6 assumes a document composed of 5 pages (print source data includes 5 pages), and shows that the reference images of all the pages have been able to be created at the fifth copy. When the number of copies of scanned images whose difference is within a predetermined range is two or more copies, the scanned images of the copies are used as the reference image. The shaded sheet in the FIG. 6 indicates that it is the reference image of each page. In this embodiment, it is premised that spoilage (dirt) does not adhere to exactly the same position and in the same shape in all the copies. Further, "XX spoiled (XX is a place)" in the figure indicates that there exists spoilage (dirt) at the position of XX of the printed matter. For example, the figure shows that the first copy of the second page has a spoilage in the upper left.

As shown in FIG. 6, because there is no spoilage on the first page in the first and second copies, the reference image can be created at the time of the second copy, and the second copy is used as the reference image. Here, even after the reference image for the first page is created, if the reference image for another page is not created (when there remains a page for which the reference image has not been created), the control is designed to continue the proof printing of the page. For example, because the reference images of the second to fifth pages have not been created when the second copy of the first page is printed, the proof printing of the third and subsequent copies of the first page is continued. It should be noted that the control may be such that the proof printing of the page is terminated when its reference image is created.

Further, because the second page has spoilage found in the first and second copies and no spoilage found in the third and fourth copies, the reference image can be created at the time of the fourth copy, and the fourth copy is used as the reference image.

Similarly, the third page has spoilage found in the first copy and no spoilage found in the second and third copies, and therefore the reference image can be created at the time of the third copy, and the third copy is used as the reference image.

Similarly, the fourth page has spoilage found in the second copy and no spoilage found in the first and third copies, and therefore the reference image can be created at the time of the third copy, and the third copy is used as the reference image.

Similarly, the fifth page has spoilage found in the first to third copies and no spoilage found in the fourth and fifth copies, and therefore the reference image can be created at the time of the fifth copy, and the fifth copy is used as the reference image.

After the reference images of all the pages are created, a reference image group for the document is created by connecting the reference images prepared for respective pages across the copy (here, the second copy of the first page, the fourth copy of the second page, the third copy of the third pages, the third copy of the fourth page, and the fifth copy of the fifth page). This reference image group is used for inspecting the output matter at the final printing and can inspect all the pages (first to fifth pages).

Further, the image forming apparatus 20 my use an output matter (assuming a sheet here) that is not spoiled at the proof printing as an output matter of the final printing. In the example shown in FIG. 6, five sheets from the first to fifth copies of the first page, three sheets from the third to fifth copies of the second page, and four sheets from the second to fifth copies of the third page, four sheets from the first and the third to fifth copies of the fourth page, two sheets from the fourth and fifth copies of the fifth page can be used as the output matters at the final printing.

It should be noted that the output matter of the proof printing may be used by the unit of copy for the output matters at the final printing, in order to simplify the control. For example, a copy whose pages are all not spoiled may be used as a printed matter of the final printing. In the example shown in FIG. 6, at the proof printing, a total of 10 sheets of the fourth and fifth copies that are not spoiled on all the first to fifth pages can be used as printed matters at the final printing.

Further, in the present embodiment, because the sheet on which the image is formed at the proof printing can be used as the printed matter at the final printing, the number of copies to be proof printed may be set a larger amount than the expected number of copies printed until the creation of the reference image of all pages is completed. Even such a control may not waste work and resources.

In FIG. 6, the reference image is created when the number of scanned images whose difference is within the predetermined value reaches the predetermined number (here, two copies), but the reference image may be created when the scanned images whose differences each is within the predetermined value are continuously obtained a predetermined number of times (for example, two copies). In this case, the fourth page has no spoilage found continuously in the third and fourth copies, and therefore the fourth copy of the fourth page is used as the reference image.

Figure 7:
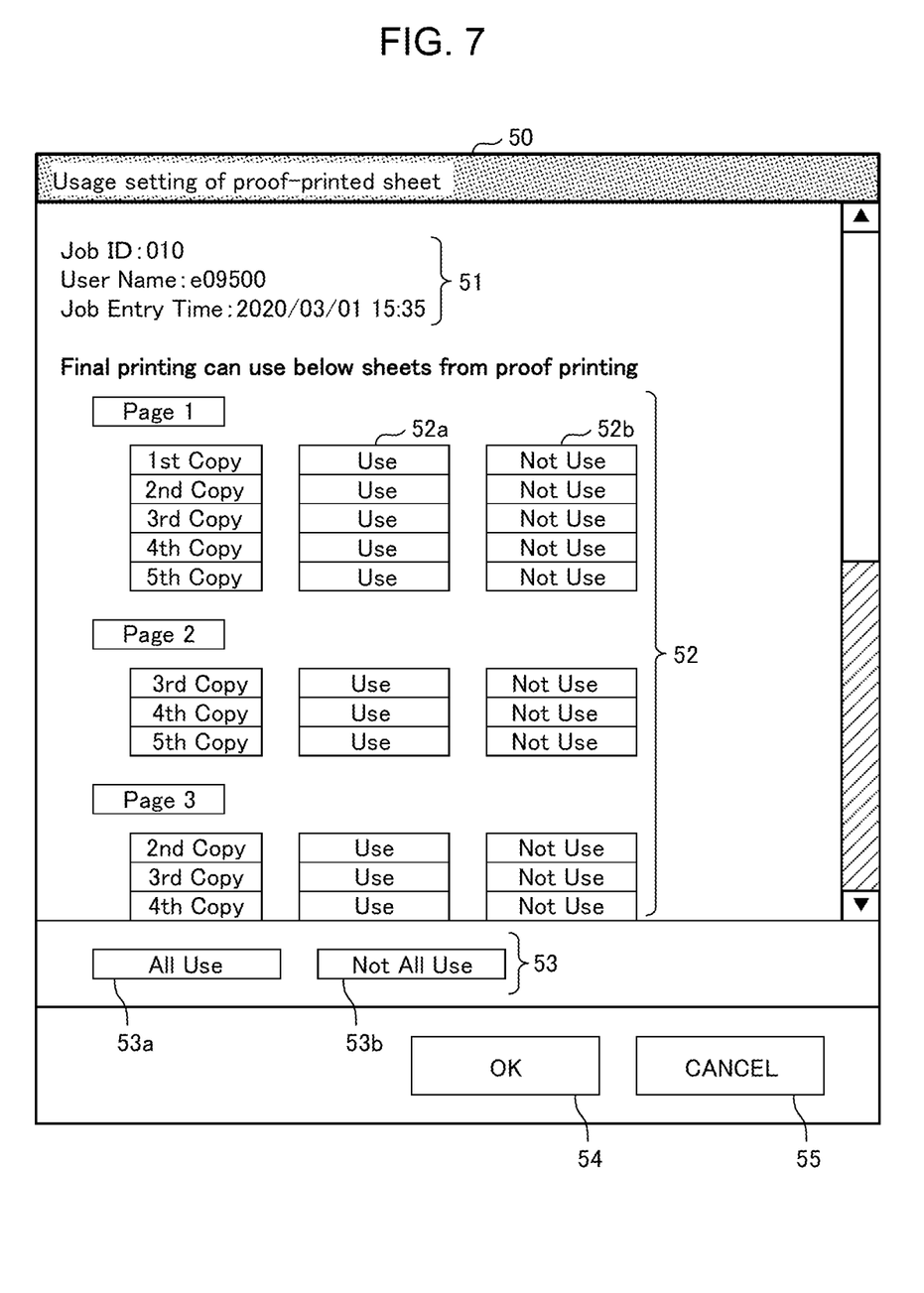
FIG. 7: an example of a sheet-usage setting screen for a user to select a sheet to be used at the final printing.

With respect to use of the sheet having an image formed at the proof printing as an output matter of the final printing, a sheet (or a copy) used by a user may be selected. FIG. 7 is an example of the sheet-usage setting screen 50 in which the sheet used by the user may be selected. The sheet-usage setting screen 50 shown in FIG. 7 allows specifying a copy order for each page and selecting whether or not to use the sheet on which an image is formed at the proof printing.

The sheet-usage setting screen 50 shown in FIG. 7 includes a print job information display area 51, a sheet-specific designation area 52, an all-sheets designation area 53, an OK button 54, and a cancel button 55. The sheet-usage setting screen 50 may be displayed on the image forming apparatus 20 or on the client terminal 10.

The print job information display area 51 displays information about the print job (for example, job ID, user name, job registration time).

The sheet-specific designation area 52 is provided with a "Use" button 52a and a "Not use" button 52b in association with a page and a copy. A user can select whether or not to use a sheet on which its image is formed at the proof printing by designating the "Use" button 52a or the "Not use" button 52b to select a copy number per each page. Information on the sheet displayed in the sheet-specific designation area 52 (that is, the sheet on which the user can select whether or not to use it as an output at the final printing) is a sheet determined to be free from spoilage at the proof printing, for example. five sheets from the first to fifth copy of the first page.

The all-sheets designation area 53 is provided with a "Use all" button 53a and a "Not use all" button 53b. When the user specifies the "Use all" button 53a, all the sheets displayed in the sheet-specific designation area 52 can be used as the output matter of the final printing. Further, when the user specifies the "Not use all" button 53b, all the sheets displayed in the sheet-specific designation area 52 can be prevented from being used as the output matter of the final printing. Note that the number of sheets or the number of copies that can be used at the final printing (or the number of sheets or the number of copies that are actually printed at the final printing) may be displayed so that the user can increase or decrease that number.

It Is preferable to provide an active/inactive prohibition rule (when one button is selected the selected button becomes active and the other button becomes inactive) for the display of the "Use" button 52a and the "Not use" button 52b, and the display of the "Use all" button 53a and the "Not use all" button 53b so as to be selected only either one of "use" and "not use" for one page.

The user selects a sheet to be used (or a sheet not to be used) in the sheet-specific designation area 52 or the all-sheets designation area 53, and then presses the OK button 54. This allows information on whether to use or not to use the sheet specified by the user to be registered. When the user will not execute selection of the sheet to be used, the user selects the cancel button 55.

<Operation of Image Forming Apparatus According to the Embodiment>

Figure 8A:
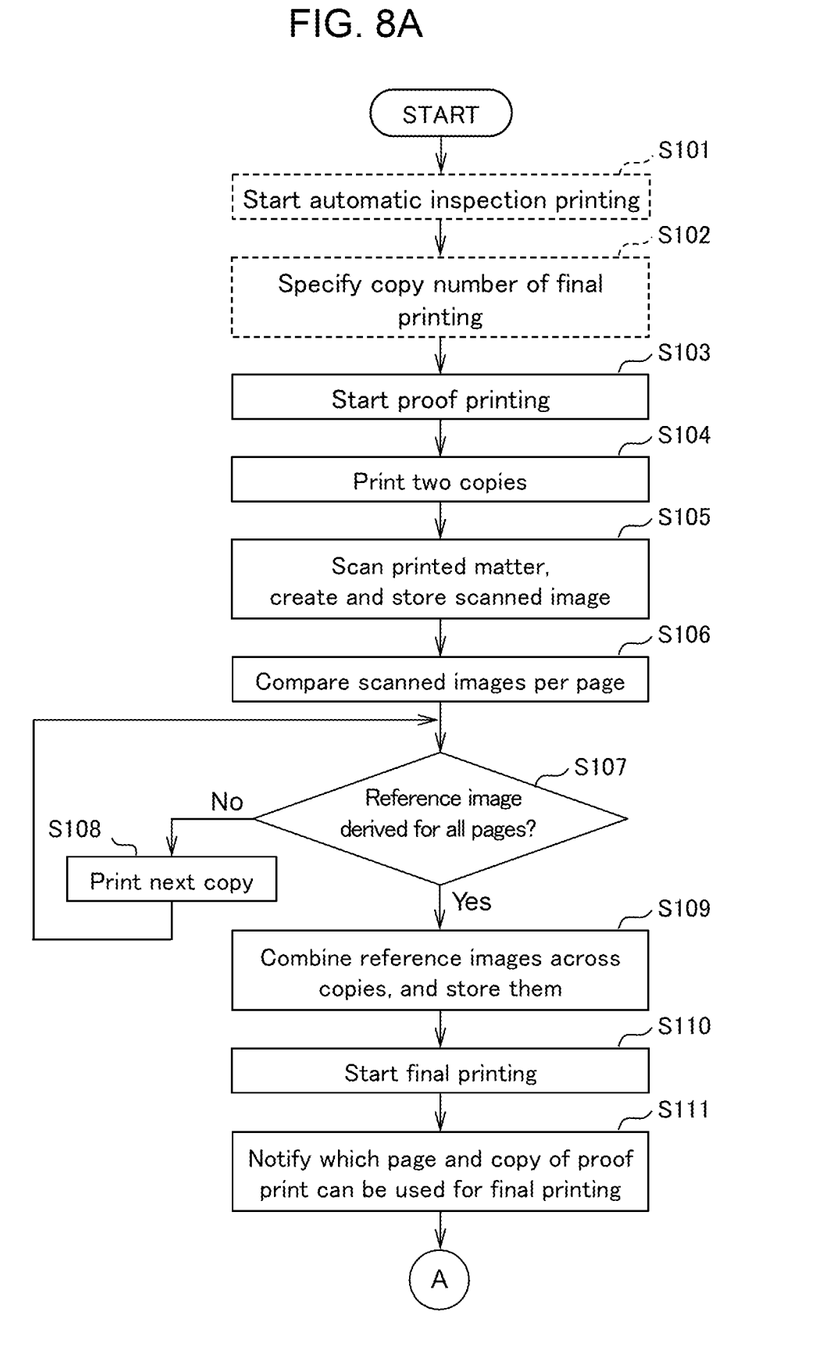
FIG. 8A: a flowchart illustrating an image forming method implemented by the image forming apparatus according to the embodiment of the present invention.
Figure 8B:
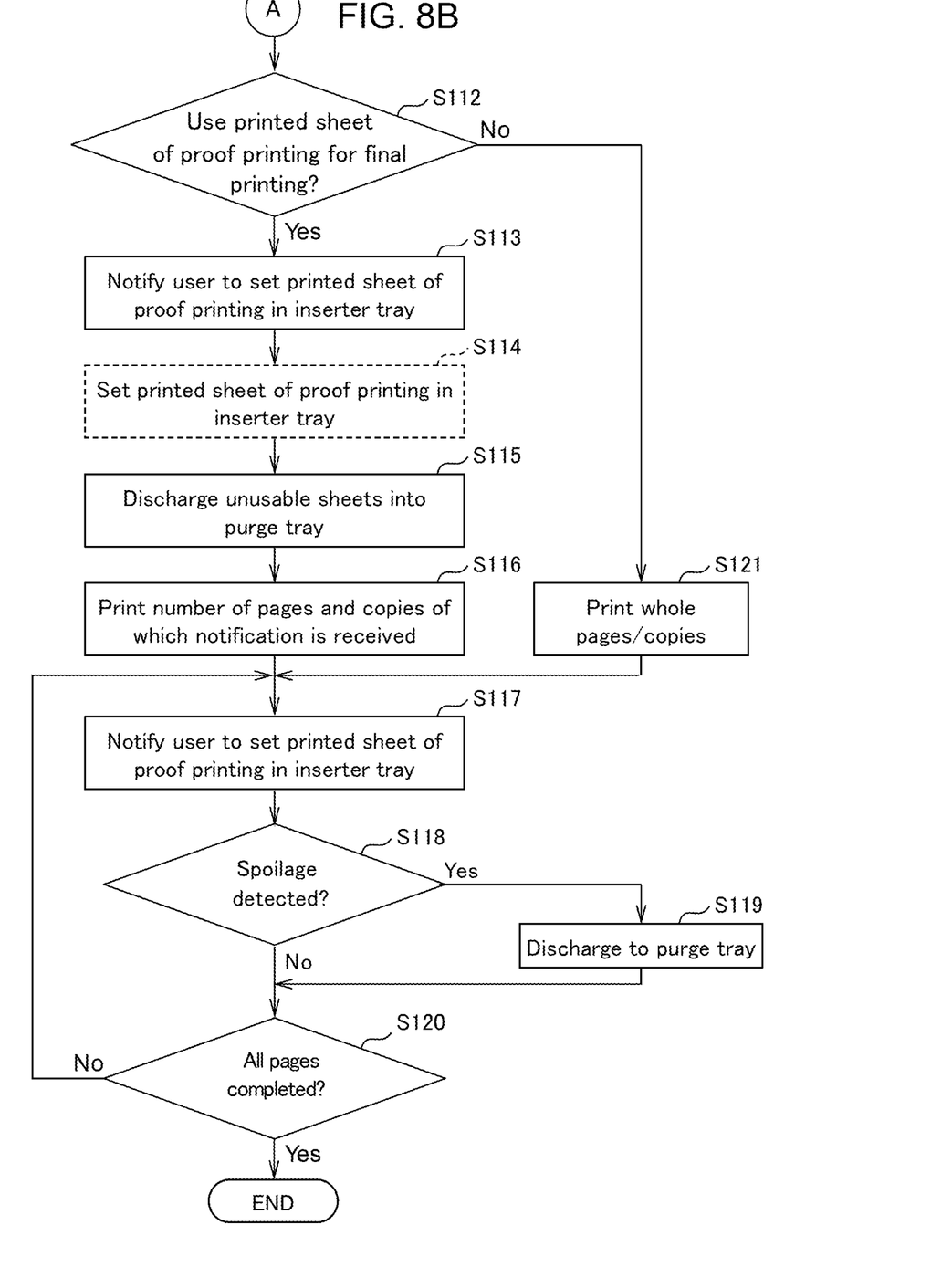
FIG. 8B: a flowchart illustrating the image forming method of the image forming apparatus according to the embodiment of the present invention.

FIGS. 8A and 8B are flowcharts illustrating an image forming method by the image forming apparatus 20 according to the embodiment of the present invention.

The CPU 21a executes a processing of each step shown in the flowcharts of FIGS. 8A and 8B by expanding and executing the image forming program stored in the ROM 21b or the storage 22 on the RAM 21c. It should be noted that the number of copies (how many copies first and in total) of the proof printing for creating the reference image may be preconfigured in advance. In FIGS. 8A and 8B, steps performed by the user are indicated by broken lines.

First, the user operates the display operation unit 24 of the image forming apparatus 20 to instruct the apparatus 20 to start an automatic inspection printing (step S101). Further, the user operates the display operation unit 24 of the image forming apparatus 20 to specify the number of copies at the time of the final printing (step S102).

When the user gives the instruction to start the automatic inspection printing and the direction of the number of copies at the time of the final printing, the controller 21 makes the image former 26 start the proof printing (step S103). Next, the controller 21 (image acquisition unit 31) instructs the image former 26 to print up to a predetermined number of copies, for example, the second copy that is the minimum number of copies required to create the reference image (step S104), makes the image reader 27 scan the printed matter to create a scanned image, and stores the scanned image in the storage 22 (step S105).

Next, the controller 21 (image creation unit 32) compares the scanned images stored per page to derive a reference image for each page (step S106). Then, the controller 21 (image creation unit 32) determines whether a reference image has been able to be derived for all respective pages, i.e., whether the number of scanned images whose differences each is within the predetermined value is equal to or more than the predetermined number (step S107). When the reference images for all the pages cannot be derived ("No" in step S107), the controller 21 instructs the image former 26 to print the next copy (step S108), and determines again whether or not a reference image has been able to be derived for all respective pages (step S107). The processes of the steps S107 and S108 are repeated until a reference image of all pages can be derived.

When the reference images of all the pages can be derived ("Yes" in step S107), the controller 21 (image creation unit 32) combines the reference images of respective pages stored in the storage 22 across copies together and stores the combined reference images in the storage 22 as a reference image group of image data corresponding to the print job (step S109). These are the reference images used for automatic inspection. Then, the controller 21 makes the image former 26 start the final printing (step S110).

Further, the controller 21 (determination unit 33) determines which page and which copy of sheet of the proof printing can be used for the final printing and notifies the user of the determination result via the display operation unit 24 (step S111). The user operates the display operation unit 24 to select whether or not to use the printed sheet of the proof printing for the final printing. The screen for notifying the user and making the selection may be a screen for selecting in detail which copy/page of the printed sheet to use, or a screen for selecting only whether or not to use the printed sheet. The controller 21 (determination unit 33) causes, for example, the sheet-usage setting screen 50 (see FIG. 7) to pop up on the display operation unit 24.

When the user selects to use the printed sheet of the proof printing for the final printing ("Yes" in step S112), the controller 21 (determination unit 33) notifies the user via the display operation unit 24 to set the printed sheet of the proof printing in the inserter tray (step S113). In response to this notification, the user sets the printed sheet of the proof printing (including a sheet that cannot be used for the final printing) in the inserter tray (step S114).

The controller 21 (tray controller 34) performs control of inserting available printed sheets into the output matters of the final printing at a timing for appropriate order of copies and pages appropriate among the printed sheets of the proof printing placed in the inserter tray; and discharging the unavailable sheets into the purge tray (step S115). The controller 21 (print number controller 35) notifies the image former 26 of the number obtained by subtracting the number of the printed sheets of the proof print that can be used for the final printing determined by the determination unit 33 from the number of pages specified by the print job and the number of copies specified in the step S102; and the image former 26 prints the number of pages and the number of copies of which the notification has been received (step S116).

When the user does not choose to use the printed sheet of the proof printing for the final printing ("No" in step S112), the controller 21 (printing number controller 35) instructs the image former 26 to print the whole number of pages and copies and the image former 26 prints the whole number of pages and copies (step S121).

During performing the final printing, the image checker 28 compares the scanned image of the sheet printed in the step S116 or the step S121 to the reference image (step S117). When the comparison in step S117 determines that the printed sheet has spoilage ("Yes" in step S118), the controller 21 (tray controller 34) controls to discharge this sheet to the purge tray (step S119). The process from steps S117 to S120 are repeatedly executed until the printing of all the sheets at the final printing is completed.

The image forming apparatus 20 according to the embodiment of the present invention configured as described above provides the following effects.

When the image forming apparatus 20 creates the reference image to be used for the inspection at the final printing from the scanned image of the output matter (printed material) at the time of the proof printing (trial printing), the image forming apparatus 20 takes in the output matter of the proof printing at the timing of the appropriate copy order and page order for the final printing to output the output matter of the proof printing as the output matter of the final printing. At this time, the image forming apparatus 20 executes the image forming operation at the final printing by the number obtained by subtracting the number of the output matters of the proof printing taken in from the number of papers specified for the printing job. Therefore, the output matter of the proof printing can be utilized as the output matter of the final printing, which allows work and resources used for the proof printing to be suppressed from being wasted.

In summary, the embodiment of the present invention may utilize an output matter of a proof print as an output matter of the final printing.

Although the embodiments of the present invention is described above, the present invention is not limited to the above-described embodiments, and may be modified or varied to be implemented as appropriate.

The means and methods for performing various processes in the printing system 1 according to the above-described embodiment can be implemented by either a dedicated hardware circuit or a computer operated by a program. The program may be provided via a computer-readable recording medium such as a flexible disk or a CD-ROM; or may be provided online via a network such as the Internet. In this case, the program recorded on the computer-readable recording medium is usually transferred to a storage device such as a hard disk (HDD) and stored therein. Further, the above program may be provided as a single application of software, or may be incorporated into software of a device as one function of the device.

Although embodiments of the present invention are described and illustrated in detail as above, the disclosed embodiments are made for purposes of illustration and example only and not limitation of the present invention.

The scope of the present invention should be interpreted by terms of the appended claims.

What is claimed is:

1. A reference image creating apparatus creating a reference image used for inspecting an image to be inspected formed on a sheet, the reference image creating apparatus comprising a hardware processor configured to obtain a plurality of scanned images created by reading a plurality of sheets on each of which the image is formed and to create the reference image on a basis of the plurality of scanned images obtained, wherein
the hardware processor executes:
receiving a setting on a predetermined number of copies on the plurality of scanned images to be obtained;
comparing a first scanned image to a second scanned image among the predetermined number of copies of scanned images obtained;
determining whether or not to use the second scanned image to create the reference image on a basis of a result of the comparing; and
excluding the second scanned image from the plurality of the scanned images to be used for creating the reference image when the second scanned image is determined not to be used for creating the reference image.

2. The reference image creating apparatus according to claim 1, wherein
the predetermined number of copies of the scanned images are scanned images created by reading the predetermined number of copies of sheets on each of which the image is formed.

3. The reference image creating apparatus according to claim 1, wherein
the hardware processor executes:
displaying on a display unit the predetermined number of copies of scanned images obtained;
accepting a user's selection from the scanned images displayed; and
using the scanned image selected in the user's selection to create the reference image.

4. The reference image creating apparatus according to claim 3, wherein
the hardware processor executes:
using the second scanned image to create the reference image, when accepting the user's selection of the second scanned image even if the second scanned image has been determined not to be used for creating the reference image.

5. The reference image creating apparatus according to claim 1, wherein
the hardware processor executes:
creating the reference image on a basis of an average of the first scanned image and the second scanned image.

6. The reference image creating apparatus according to claim 5, wherein
the hardware processor executes:
creating the reference image on a basis of an average of pixel values of the first scanned image and the second scanned image.

7. The reference image creating apparatus according to claim 1, wherein
the hardware processor executes:
determining whether or not to use the second scanned image to create the reference image on a basis of difference of the second scanned image from the first scanned image.

8. A computer-readable non-transitory storage medium including a program executed by a computer of a reference image creating apparatus for creating a reference image used for inspecting an image to be inspected formed on a sheet, the program causing the computer to execute:
a step of obtaining a plurality of scanned images created by reading a plurality of sheets on which the images are respectively formed;
a step of creating the reference image on a basis of the plurality of scanned images obtained; and
a step of receiving a setting on a predetermined number of copies on the plurality of scanned images to be obtained, wherein
in the step of creating the reference image, the program causing the computer to execute:
a step of comparing a first scanned image to a second scanned image among the predetermined number of copies of scanned images obtained;
a step of determining whether or not to use the second scanned image to create the reference image on a basis of a result of the comparing; and
a step of excluding the second scanned image from the plurality of the scanned images to be used for creating the reference image when the second scanned image is determined not to be used for creating the reference image.

9. The computer-readable non-transitory storage medium according to claim 8, wherein
the predetermined number of copies of the scanned images are scanned images created by reading the predetermined number of copies of sheets on each of which the image is formed.

10. The computer-readable non-transitory storage medium according to claim 8, wherein
in the step of creating the reference image, the program causing the computer to execute:
a step of displaying on a display unit the predetermined number of copies of scanned images obtained;
a step of accepting a user's selection from the scanned images displayed, and
a step of using the scanned image selected in the user's selection to create the reference image.

11. The computer-readable non-transitory storage medium according to claim 10, wherein
in the step of creating the reference image, the program causing the computer to execute:
a step of using the second scanned image to create the reference image, when accepting a user's selection of the second scanned image even if the second scanned image has been determined not to be used for creating the reference image.

12. The computer-readable non-transitory storage medium according to claim 8, wherein
the program further causing the computer to execute:
the step of creating the reference image on a basis of an average of the first scanned image and the second scanned image.

13. The computer-readable non-transitory storage medium according to claim 12, wherein
the program further causing the computer to execute:
the step of creating the reference image on a basis of an average of pixel values of the first scanned image and the second scanned image.

14. The computer-readable non-transitory storage medium according to claim 8, wherein
in the step of creating the reference image, the program further causing the computer to execute:

a step of determining whether or not to use the second scanned image to create the reference image on a basis of difference of the second scanned image from the first scanned image.

15. A reference image creation system for creating a reference image used for inspecting an image to be inspected formed on the sheet, comprising:

an image former forming an image on a sheet, an image reader reading the image formed on the sheet, and a hardware processor configured to obtain a plurality of scanned images created by the image reader's reading of a plurality of sheets on each of which the image is formed by the image former and to create the reference image on a basis of the plurality of scanned images obtained, wherein the hardware processor executes:

receiving a setting on a predetermined number of copies on the plurality of scanned images to be obtained;

comparing a first scanned image to a second scanned image among the predetermined number of copies of scanned images obtained;

determining whether or not to use the second scanned image to create the reference image on a basis of a result of the comparing; and excluding the second scanned image from the plurality of the scanned images to be used for creating the reference image when the second scanned image is determined not to be used for creating the reference image.

16. The reference image creation system according to claim 15, wherein
the predetermined number of copies of the scanned images are scanned images created by the image reader reading the predetermined number of copies of sheets on each of which the image is formed by the image former.

17. The reference image creation system according to claim 15, wherein the hardware processor executes:

displaying on a display unit the predetermined number of copies of scanned images obtained;

accepting a user's selection from the scanned images displayed; and using the scanned image selected in the user's selection to create the reference image.

18. The reference image creation system according to claim 17, wherein the hardware processor executes:

using the second scanned image to create the reference image, when accepting a user's selection of the second scanned image even if the second scanned image has been determined not to be used for creating the reference image.

19. The reference image creation system according to claim 15, wherein the hardware processor executes:

determining whether or not to use the second scanned image to create the reference image on a basis of difference of the second scanned image from the first scanned image.

\* \* \* \* \*